United States Patent
Koike-Akino et al.

(10) Patent No.: US 9,473,250 B2
(45) Date of Patent: Oct. 18, 2016

(54) SYSTEM AND METHOD FOR RECOVERING CARRIER PHASE IN OPTICAL COMMUNICATIONS

(71) Applicant: Mitsubishi Electric Research Laboratories, Inc., Cambridge, MA (US)

(72) Inventors: Toshiaki Koike-Akino, Malden, MA (US); Keisuke Kojima, Weston, MA (US); David Millar, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 66 days.

(21) Appl. No.: 14/475,932

(22) Filed: Sep. 3, 2014

(65) Prior Publication Data

US 2016/0065315 A1    Mar. 3, 2016

(51) Int. Cl.
*H04B 10/61* (2013.01)
*H04L 7/00* (2006.01)
*H04L 1/00* (2006.01)

(52) U.S. Cl.
CPC ......... *H04B 10/6165* (2013.01); *H04L 1/0054* (2013.01); *H04L 1/0055* (2013.01); *H04L 1/0057* (2013.01); *H04L 7/0062* (2013.01); *H04L 7/0075* (2013.01)

(58) Field of Classification Search
CPC .......... H04B 10/6165; H04B 10/6164; H04B 10/616; H04B 10/61; H04L 25/03318; H04L 25/03178; H04L 7/0079; H04L 7/033; H04L 1/0054; H04L 1/0055; H04L 1/0057; H04L 7/0062; H04L 7/0075; H04L 27/22; H04L 27/227; H04L 1/0045; H04L 1/005
See application file for complete search history.

(56) References Cited

U.S. PATENT DOCUMENTS 7,522,841 B2 * 4/2009 Bontu ................... H04J 3/0608
                                              398/152
8,311,417 B1 * 11/2012 Poggiolini ........... H04B 10/611
                                              398/147

(Continued)

FOREIGN PATENT DOCUMENTS

EP        2506516 A1   10/2012
WO    2012006575 A1    1/2012

(Continued)

OTHER PUBLICATIONS

Ibragimov et al. "Cycle Slip Probability in 100G PM-QPSK systems," Optical Fiber Communication Collocated National Fiber Optic Engineers Conference, 2010 Conference on, IEEE Piscataway NJ, US. pp. 1-3, Mar. 21, 2010.

(Continued)

*Primary Examiner* — Sophia Vlahos
(74) *Attorney, Agent, or Firm* — Gene Vinokur; James McAleenan; Hironori Tsukamoto

(57) ABSTRACT

The embodiments of the invention provide methods to deal with problems of cycle slips, angular skew, and residual phase noise for high-speed optical communications employing any arbitrary high-order multi-dimensional modulation formats. The embodiments use a slip process analyzer, a skew angle estimator, and a phase noise variance estimator to provide feedforward soft-decision information of a carrier phase recovery (CPE) for more accurate likelihood calculation based on a high-order hidden Markov model (HMM). The log-likelihood calculation can be done jointly in dual polarization with joint Markov state transition. Some embodiments use a kernel filter or a particle filter for log-likelihood calculation.

20 Claims, 5 Drawing Sheets

(56) References Cited

U.S. PATENT DOCUMENTS

| | | | |
|---|---|---|---|
| 8,718,203 B2* | 5/2014 | Jacobsen | H04L 25/03057 375/262 |
| 9,036,992 B2* | 5/2015 | Djordjevic | H04B 10/616 398/149 |
| 9,106,346 B2* | 8/2015 | Leven | H04L 27/233 |
| 9,112,615 B1* | 8/2015 | Thesling | H04B 10/6165 |
| 2008/0123210 A1* | 5/2008 | Zeng | G11B 20/10009 360/51 |
| 2012/0096327 A1 | 4/2012 | Cai | |
| 2012/0269247 A1 | 10/2012 | Li et al. | |
| 2013/0272704 A1 | 10/2013 | Zamani et al. | |
| 2013/0329834 A1 | 12/2013 | Zhou | |
| 2014/0010532 A1 | 1/2014 | Zhang et al. | |
| 2014/0195878 A1* | 7/2014 | Razzetti | H04B 10/6165 714/776 |
| 2015/0188642 A1* | 7/2015 | Sun | H04J 14/02 398/202 |
| 2015/0195081 A1* | 7/2015 | Matsumoto | H04B 1/76 375/371 |
| 2015/0333838 A1* | 11/2015 | Horikoshi | H04L 27/066 398/208 |

FOREIGN PATENT DOCUMENTS

| | | |
|---|---|---|
| WO | 2014115840 A1 | 7/2014 |
| WO | 2014187742 A1 | 11/2014 |

OTHER PUBLICATIONS

Gao et al., "Cycle-Slip Resilient Carrier Phase Estimation for Polarization Multiplexed 16-QAM Systems," Opto Electronics and Communications Conference (OECC), 2012 17th IEEE, Jul. 2, 2012, pp. 154-155.

Kamiya et al., "Pilot-Symbol Assisted and Code-Aided Phase Erroe Estimation for High Order QAM Transmission," IEEE Transactions on Communications, vol. 61. No. 10. pp. 4369-4380, Oct. 1, 2013.

* cited by examiner

SYSTEM AND METHOD FOR RECOVERING CARRIER PHASE IN OPTICAL COMMUNICATIONS

FIELD OF THE INVENTION

The present invention relates generally to optical communications and more particularly to estimating phases for a soft-decision decoder in a receiver of a coherent optical communications system.

BACKGROUND OF THE INVENTION

Coherent optical communications technologies have increased data rates by using amplitude, phase, x-polarization, and y-polarization. Conventional non-coherent optical communications use only amplitude component of optical fields. Coherent modulations, like quadrature-amplitude modulation (QAM) or amplitude and phase-shift keying (APSK), require carrier phase estimation (CPE) for demodulating. Conventionally, feedforward CPE based on phase unwrapping has been used. For example, an $M^{th}$ power method is used particularly for PSK modulation formats. The Viterbi-and-Viterbi (V&V) method uses a certain non-linear function for amplitude normalization in conjunction with the $M^{th}$ power method to improve estimation accuracy of the carrier phase.

Those blind CPE methods do not perform well for high-order QAM signal constellations, which are required to realize high data rates in next-generation optical communications. In addition, those methods have a fundamental problem of phase ambiguity, caused by the $M^{th}$ power method. To recover the phase ambiguity, a phase unwrapping method is typically used. A simple phase unwrapping method can cause an additional problem known as cycle slips. A cycle slip happens with an abrupt change of phase in the CPE when a phase tracking loop in a receiver experiences a temporary loss of lock due to signal distortion, or some other disturbing factors, such as nonlinear phase noise.

Differential encoding or pilot symbol insertion can be used to reduce cycle slips. However, differential encoding has a fundamental problem of the doubling bit-error rate (BER) due to error propagation. The pilot symbol insertion also has an inevitable drawback in the reduction of the spectrum efficiency because of the undesired overhead of the pilot symbols.

With forward-error correction (FEC) codes, such as low-density parity-check (LDPC) codes, the so-called turbo principle is used to cope with various impairments in optical communications. For example, turbo equalizations can reduce linear and non-linear distortions. Turbo differential decoding has been used to compensate for the degradation of error propagation in differential encoding. Cycle slip problems have been dealt with by a turbo CPE, which uses soft-decision feedback from an FEC decoder. However, feeding back the soft-decision information from the decoder to the CPE can increase the overall latency. Instead of feeding back the soft-decision information from the FEC decoder to the CPE, the latency can be reduced by feeding back to a demodulator to compensate for cycle slips. However, it does not work well if a cycle slip probability is already high at the feedforward CPE.

The cycle slip problem becomes even more severe for high-order QAM transmissions. In high-order QAM transmissions, the in-phase of reference laser signal is referred to as I, and the quadrature signal that is shifted by 90 degrees is called Q. To generate I-Q balanced perfect QAM constellations, accurate and stable bias controls for Mach-Zender modulators are highly required. However, such a bias control is not achieved in practice especially for high-speed transceivers and high-order modulations such as 1024QAM. The bias imperfection causes a problem of angular skew, where the constellation points deviate from the ideal square-grid points according to the skew angle between I axis and Q axis.

Conventionally, one can use a Gram-Schmidt orthogonalization and k-means clustering to compensate for the skew problem. Along with the skew problem, there is still a residual phase noise after the CPE. The phase noise comes from impairment such as fiber nonlinearity and laser linewidth. The residual phase noise can degrade performance for dense high-order QAM signals. Accordingly, there is a need in the art for an approach in handling the cycle slip and the angular skew as well as the phase noise for high-order QAM transmissions in high-speed optical communications systems.

SUMMARY OF THE INVENTION

The embodiments of the invention provide a system and method to resolve problems of cycle slips, angular skew, and residual phase noise for high-speed optical communications employing any arbitrary high-order multi-dimensional modulation formats. The embodiments use an unwrapping history at a carrier phase estimation (CPE) to provide feedforward soft-decision information of slip probability for more accurate likelihood calculation based on a high-order hidden Markov model (HMM). Decoder feedback information can be used to update the likelihood at a demodulator module, while in an increase in the latency is marginal because the CPE does not need the decoder feedback information.

The receiver includes a feedforward CPE, a slip process analyzer, an angular skew estimator, a phase noise estimator, a demodulator, and a forward error correction (FEC) decoder. In one embodiment, the CPE uses multiple-input multiple-output (MIMO) processing, wherein a noise correlation matrix is used to deal with a polarization-dependent phase noise process. The MIMO processing allows any extension to a multi-dimensional signal space, e.g., for polarization multiplexing, wavelength-division multiplexing, mode-division multiplexing, and space-division multiplexing, as advanced coherent optical communications techniques.

The slip process analyzer provides reliability information of unwrapping decisions, by using statistics of decision errors according to a history of phase estimates. The log-likelihood ratio calculation in the demodulator is based on the soft-decision unwrapping information. The unwrapping soft-decision information can compensate for the undesired slips. To compensate for the angular skew and the phase noise, the skew angle and the residual phase noise variance are estimated during the symbol likelihood calculation. Given the likelihood, the FEC decoder corrects potential errors. In one embodiment, soft-decision information of the FEC decoder can be fed back to the log-likelihood ratio calculator, based on a turbo principle, to improve performance.

Some embodiments use a time-homogeneous or a time-inhomogeneous hidden Markov model (HMM) for the slip process analyzer. The log-likelihood ratio calculation is based on the Markov state transition with an averaged or an instantaneous slip probability. With a high-order HMM, the log-likelihood ratio is computed by various different algorithms, including Bahl-Cocke-Jelinek-Raviv (BCJR) maximum a posteriori probability (MAP) algorithm, soft-output Viterbi algorithm, Wiener filter, Kalman filter, kernel filter, neural network filter, particle filter, or smoothing variants. The log-likelihood calculation can be done jointly in dual polarization with joint Markov state transition.

Some embodiments use joint polarization low-pass filtering for a more accurate CPE, in which a moment matching method is used to derive a closed-form stochastic model. Some other embodiments use an optimized amplitude normalization to minimize the mean-square error according to modulation formats, residual additive noise and phase noise variances. One embodiment of the invention uses a relatively small number of pilot symbols to improve performance of the CPE and/or the demodulator through the use of decision-directed filter adaptation.

DETAILED DESCRIPTION OF THE PREFERRED EMBODIMENTS

Figure 1:
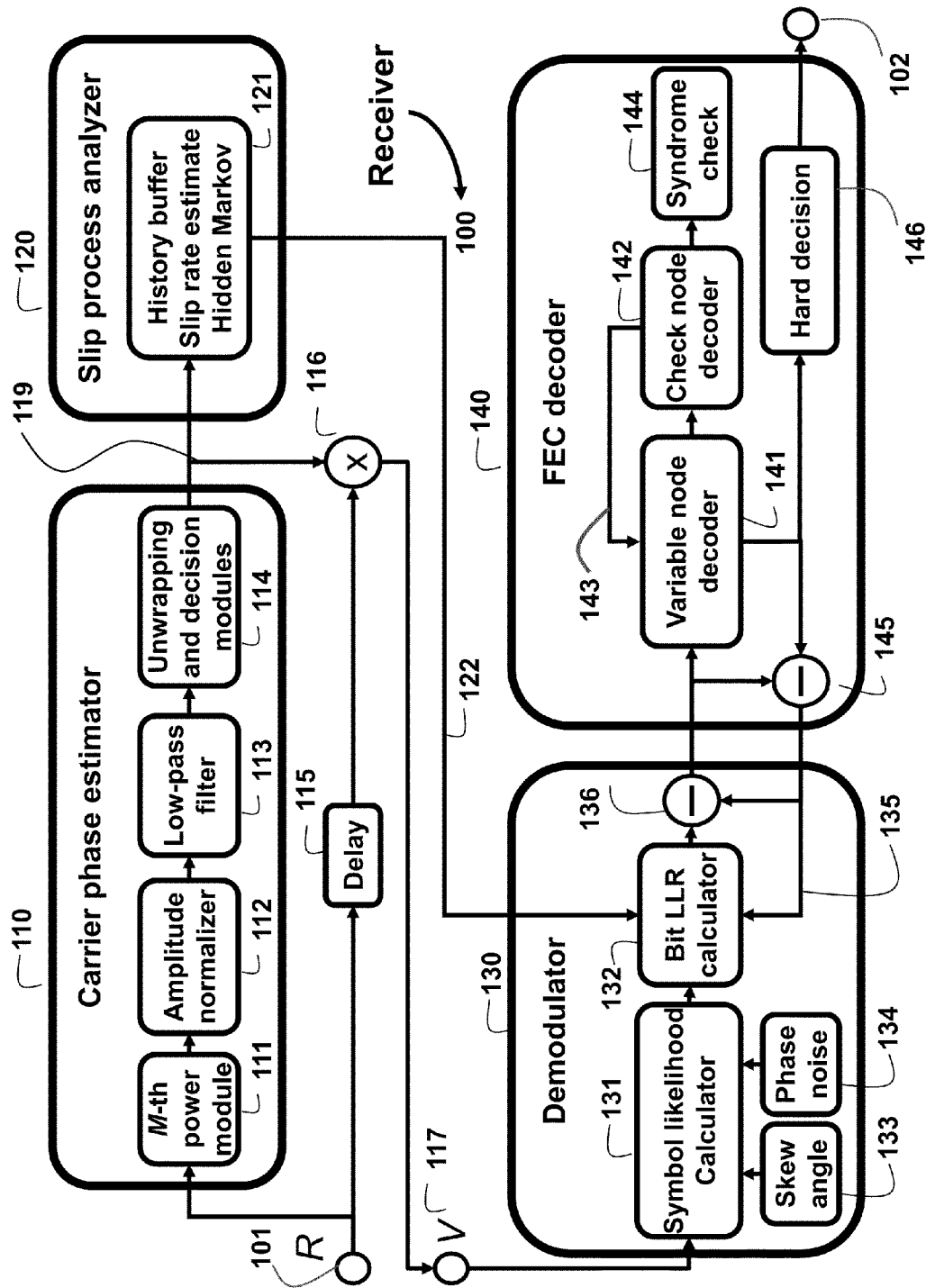
FIG. 1 is a block diagram of a system and method for decoding data sent from a transmitter to a receiver over an optical communications channel, and for recovering carrier phase of optical signals according to embodiments of the invention.

FIG. 1 is a block diagram of a system and method for decoding data sent from a transmitter to a receiver 100 over an optical communications channel, and in particular to detecting a coherent signal at an optical communications receiver according to embodiments of the invention.

The system includes a carrier phase estimator (CPE) 110, a slip process analyzer 120, a demodulator 130, and a forward-error-correction (FEC) decoder 140. The embodiments of the invention make it possible to recover cycle slips, I-Q angular skew and residual phase noise, where I and Q represent an in-phase component of the waveform and a quadrature component, respectively.

In some embodiments of the invention, the CPE 110 includes an $M^{th}$ power module 111, an amplitude normalizer 112, a low-pass filter 113, and a phase unwrapping and decision modules 114. This embodiment is based on a Viterbi-and-Viterbi (V&V) blind CPE procedure. The $M^{th}$ power module 111 feeds received data R or symbols 101, which had been the result of an I-Q signal waveform having been processed by receiver digital signal processing (DSP) modules to perform functions such as timing recovery, chromatic dispersion compensation, nonlinearity compensation, and polarization recovery. Therefore, the terms received data, received symbols, and received signals are used interchangeably.

In the $M^{th}$ power module 111, the received data R are processed by an exponentiation of M to provide $R^M$. For example, M=4 is used for square quadrature-amplitude modulation (QAM) formats. The $M^{th}$ power module suppresses modulation-dependent phase deviation.

The amplitude normalizer 112 suppresses modulation-dependent amplitude deviation and scales the amplitude of $|R|$ by a nonlinear function $F(|R|)$ to provide $F(|R|)R^M$. For example, the nonlinear function is a monomial function of $F(|R|)=1/|R|^C$, where a monomial exponent C is any arbitrary real-valued number. Setting C=M reduces to a conventional $M^{th}$ power CPE, which works only for M-ary phase-shift keying (PSK). For high-order QAMs, one embodiment uses piece-wise polynomial function depending on modulation size as $$F(|R|) = \begin{cases} \dfrac{a_1|R| + b_1}{|R|^M}, & A_-^1 < |R| < A_+^1, \\ \dfrac{a_2|R| + b_2}{|R|^M}, & A_-^2 < |R| < A_+^2, \\ \vdots \\ 0, & \text{Otherwise} \end{cases}$$

For example, the parameters of $\alpha_1=122.3$, $b_1=0$, $A_-^1=0$, $A_+^1=0.7$, $a_2=331.9$, $b_2=-30.5$, $A_-^2=1.2$, $A_+^2=\infty$ are used for 16QAM, and the parameters of $a_1=106.4$, $b_1=0$, $A_-^1=0$, $A_+^1=0.34$, $a_2=321.2$, $b_2=0$, $A_-^2=0.59$, $A_+^2=0.69$, $a_3=717$, $b_3=0$, $A_-^3=1.44$, $A_+^3=\infty$ are used for 64QAM.

In another embodiment, the amplitude normalizer 112 is dependent on signal-to-noise ratio (SNR), as well as modulation formats. For example, the nonlinear function is based on a conditional mean for Q-ary constellations as $\{S_1, \ldots, S_Q\}$, $$F(|R|) = \frac{1}{Q} \sum_{m=1}^{Q} \frac{e^{-j4\angle S_m}}{|R|^8 |S_m|^4 (1 - e^{-4|R||S_m|/\sigma^2})}$$

$$\big( (|R|^2|S_m|^2 + 2\sigma^4 - 2|R||S_m|\sigma^2)(|R|^2|S_m|^2 + 6\sigma^4 - 6|R||S_m|\sigma^2) -$$

$$(|R|^2|S_m|^2 + 2\sigma^4 + 2|R||S_m|\sigma^2)$$

$$(|R|^2|S_m|^2 + 6\sigma^4 + 6|R||S_m|\sigma^2)e^{-4|R||S_m|/\sigma^2} \big)$$

where $\sigma^2$ is a noise variance.

The low-pass filter 113 uses a finite-impulse response (FIR) filter taking a weighted sum of the output of the amplitude normalizer 112 to suppress additive noise and phase noise disturbance. The low-pass filter can include a rectangular filter, whose filter coefficients are all ones. Alternatively, the low-pass filter is based on an exponential weighted filter, whose filter coefficients are given by $\exp(-|k\alpha|^\beta)$ for the $k^{th}$ adjacent symbol over $k=0, \pm 1, \pm 2, \ldots, \pm L$, where L is the filter pre/post-cursor length, and $\alpha$ and $\beta$ are any arbitrary real-valued numbers.

In one embodiment of the invention, the low-pass filter 113 can be based on a moment-matching method and a linear-transformed Wiener filter according to an auto-covariance of phase. The linearized Wiener filter considers that the phase noise is a stochastic Wiener process.

The received data R can be modeled with an unknown phase noise θ as $$R(k)=S(k)\exp(j\theta(k))+W(k),$$

where S is a transmitted signal, $j=\sqrt{-1}$ is an imaginary unit, and W is an additive noise of variance $\sigma^2$. The index k inside parentheses denotes the symbol index. Here, the phase noise can be modeled by the Wiener process, which has an auto-covariance matrix of $$K_p = \sigma_p^2 \begin{pmatrix} \ddots & \vdots & \vdots & \vdots & \vdots & \vdots & \iddots \\ \ldots & 2 & 1 & 0 & 0 & 0 & \ldots \\ \ldots & 1 & 1 & 0 & 0 & 0 & \ldots \\ \ldots & 0 & 0 & 0 & 0 & 0 & \ldots \\ \ldots & 0 & 0 & 0 & 1 & 1 & \ldots \\ \ldots & 0 & 0 & 0 & 1 & 2 & \ldots \\ \iddots & \vdots & \vdots & \vdots & \vdots & \vdots & \ddots \end{pmatrix},$$

where $\sigma_p^2$ is a phase noise variance of the Wiener process. The above auto-covariance is based on a two-sided central cursor. Alternatively, one embodiment uses a one-sided pre-cursor auto-covariance matrix given as $$K_p = \sigma_p^2 \begin{pmatrix} 1 & 1 & 1 & 1 & 1 & 1 & \ldots \\ 1 & 2 & 2 & 2 & 2 & 2 & \ldots \\ 1 & 2 & 3 & 3 & 3 & 3 & \ldots \\ 1 & 2 & 3 & 4 & 4 & 4 & \ldots \\ 1 & 2 & 3 & 4 & 5 & 5 & \ldots \\ 1 & 2 & 3 & 4 & 5 & 6 & \ldots \\ \vdots & \vdots & \vdots & \vdots & \vdots & \vdots & \ddots \end{pmatrix}.$$

With the auto-covariance matrix, the FIR coefficients of the linearized Wiener filter are expressed by using the linear transform of $\exp(j\theta) \cong 1+j\theta$ as $$\gamma(K_p+\kappa I)^{-1}1,$$

where I is an identity matrix, 1 is an all-ones vector of size 2L+1, γ and κ are arbitrary positive real-valued numbers, and a superscript of $[.]^{-1}$ represents a matrix inversion. For example, the parameters are set to be $\gamma=1/1^T(K_p+\kappa I)^{-1}1$ and $\kappa=\sigma^{-2}/M^2$ with a superscript of $[.]^T$ being a matrix transpose.

In another embodiment of the invention, the phase noise is linearized for a real part and an imaginary part of $\exp(j\theta(k))$ separately. Instead of using the linear transform, a moment-matching method is used. The first moments of the real and imaginary parts are expressed as $$[\mu_R]_k = \exp(-\tfrac{1}{2} e_k^T K_p e_k),$$

$$[\mu_I]_k = 0,$$

respectively, where $[.]_k$ is the $k^{th}$ entry of a vector and $e_k$ is the $k^{th}$ unit vector, whose entries are zeros and the $k^{th}$ entry is one.

The second moments of the real and imaginary parts are expressed as $$[\Sigma_R]_{k,l} = \tfrac{1}{2}\exp(-\tfrac{1}{2}(e_k-e_l)^T K_p(e_k-e_l)) + \tfrac{1}{2}\exp(-\tfrac{1}{2}(e_k+e_l)^T K_p(e_k+e_l))$$

$$[\Sigma_I]_{k,l} = \tfrac{1}{2}\exp(-\tfrac{1}{2}(e_k-e_l)^T K_p(e_k-e_l)) + \tfrac{1}{2}\exp(-\tfrac{1}{2}(e_k+e_l)^T K_p(e_k+e_l))$$

respectively, where $[.]_{k,l}$ denotes a $(k,l)^{th}$ entry of a matrix.

Figure 2:
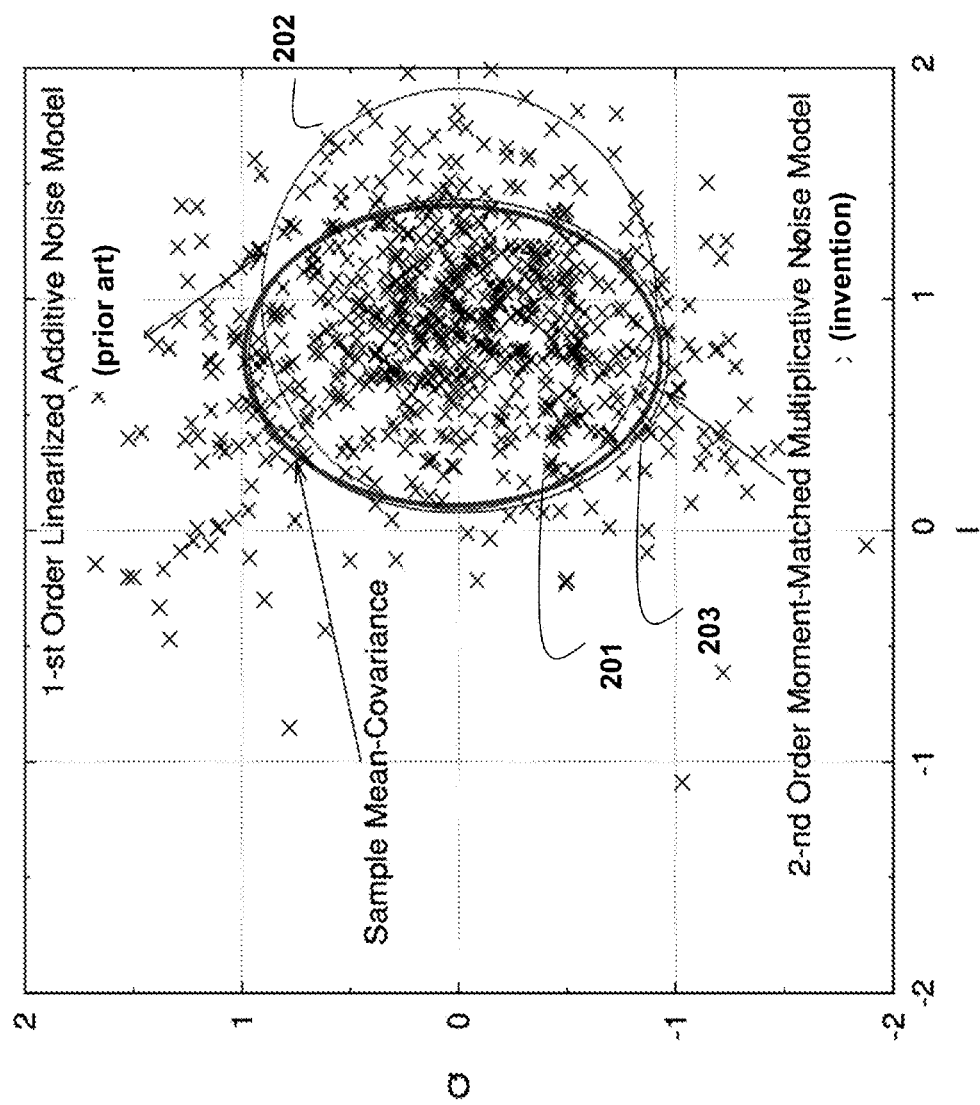
FIG. 2 is a plot as a function of I and Q, for a prior art first-order linearized additive noise model, and a second-order moment-matched multiplicative noise model according to embodiments of the invention.

FIG. 2 shows a prior art first-order linearized additive noise model, a second-order moment-matched multiplicative noise model according to embodiments of the invention, and mean and covariance over several symbols. The sample mean-covariance 201 does not agree with the mean-covariance of the linear-transformed Wiener filter 202, while the sample mean-covariance agrees well with the mean-covariance of the moment-matching method 203. With the moment-matching method, this embodiment uses the following modified FIR filter coefficients:

$$(\tilde{R}^T(\Sigma+\kappa I)^{-1}\tilde{R})^{-1}\tilde{R}^T(\Sigma+\kappa I)^{-1}\mu,$$

where $\tilde{R}$ is a matrix formed by real and imaginary parts of the output of the amplitude normalizer, Σ is a matrix formed by the second moments of the real and imaginary parts, and μ is a vector formed by the first moments of the real and imaginary parts.

The phase unwrapping and decision modules 114 resolve phase ambiguities and recover the carrier phase of the received data based on the output of the low-pass filter 113. For example, the phase estimate by the unwrapping module 114 is obtained as follows $$\hat{\theta}(k) = \frac{1}{M}(\angle R'(k) + 2\pi m(k)),$$

where the operator ∠ denotes a phase of a complex-valued argument, R'(k) is an output of the low-pass filter at the $k^{th}$ symbol, and the unwrapping index integer m(k) is determined such that the phase estimate does not change a lot compared to the previous phase estimate as follows $$m(k)=\arg\min|\hat{\theta}(k)-\hat{\theta}(k-1)|^2.$$

In one embodiment of the invention, the phase unwrapping module 114 is based on at least two consecutive phase estimates to minimize a Mahalanobis norm. For example, the unwrapping index integers $m(k)=[m(k), \ldots, m(k+N-1)]^T$ for N consecutive estimates $\hat{\theta}(k)=[\hat{\theta}(k),\ldots,\hat{\theta}(k+N-1)]$ are determined to minimize a Mahalanobis norm as follows $$m(k)=\arg\min \hat{\theta}^T(k) K_p^{-1}\hat{\theta}(k),$$

by using a sliding window estimator. Alternatively, the phase upwrapping 114 uses a Viterbi algorithm to minimize the Mahalanobis norm over a trellis-state diagram.

The estimated phase θ(k) at the CPE 110 is used to recover the carrier phase of the received data R(k) 101 to provide V(k) 117 by a multiplication 116 after a delay 115, corresponding to a latency of the CPE, as follows $$V(k)=R(k)\exp(-j\hat{\theta}(k)).$$

The phase unwrapping of the CPE 110 may make a wrong decision, resulting in a cycle slip, which detrimentally affects the FEC decoder 140. To compensate for the potential cycle slips, the slip process analyzer 120 stores the estimated phase $\hat{\theta}(k)$ 119 in a buffer memory for several symbols, e.g., for 100 symbols, and estimates the slip probability based on a hidden Markov model (HMM) 121. For example, a state-transition matrix of the first-order Markov model for M=4 is expressed as $$\Pi=\text{Circulant}[(1-q)^2, q(1-q), q^2, q(1-q)],$$

where $q=1-\sqrt{1-p}$ for an unknown slip probability p, and Circulant[.] is a circulant matrix operator given a vector argument as follows $$\text{Circulant}[a, b, c, d] = \begin{pmatrix} a & b & c & d \\ d & a & b & c \\ c & d & a & b \\ b & c & d & a \end{pmatrix}.$$

In some embodiments of the invention, a Kalman filter is used to adaptively learn the state-transition matrix Π based on a time-homogeneous HMM, in which the slip probability p does not change fast over time. Alternatively, a typical slip probability, e.g., p=0.001, is predetermined.

In some other embodiments of the invention, the slip process analyzer 120 provides a time-varying state-transition matrix to the demodulator 130 as feedforward soft-decision information, according to the instantaneous phase estimates $\hat{\theta}(k)$ based on a time-inhomogeneous HMM using an extended Kalman filter for at least two consecutive phase estimates.

For example, the state-transition matrix for the first-order time-inhomogeneous HMM with M=4 is expressed as $$\Pi = \text{Circulant}\left[\eta\vartheta_3\left(\frac{\hat{\theta}(k-1)-\hat{\theta}(k)}{2}, \exp\left(-\frac{\sigma_p^2}{2}\right)\right),\right.$$
$$\eta\vartheta_3\left(\frac{\hat{\theta}(k-1)-\hat{\theta}(k)-\pi/2}{2}, \exp\left(-\frac{\sigma_p^2}{2}\right)\right),$$
$$\eta\vartheta_3\left(\frac{\hat{\theta}(k-1)-\hat{\theta}(k)-\pi}{2}, \exp\left(-\frac{\sigma_p^2}{2}\right)\right),$$
$$\left.\eta\vartheta_3\left(\frac{\hat{\theta}(k-1)-\hat{\theta}(k)-3\pi/2}{2}, \exp\left(-\frac{\sigma_p^2}{2}\right)\right)\right],$$

where η is a normalization factor such that the argument vector of the circulant matrix operator is summed up to one, and $\theta_3(.)$ is the third-order theta function defined as $\theta_3(a, b)=1+2\sum_{n=1}^{\infty} b^{n^2} \cos(2na)$. Those embodiments of the invention provide more accurate soft-decision information of the CPE to the demodulator according to the phase estimation deviation over time.

The demodulator 130 includes a symbol likelihood calculator 131, a skew angle estimator 133, a phase noise estimator 134, and a bit log-likelihood ratio (LLR) calculator 132. The demodulator 130 receives the phase-recovered data V(k) 117 to calculate LLR data according to the feedforward soft-decision information 122 for the FEC decoder 140. In the symbol likelihood calculator 131, symbol log-likelihood information is generated as $$D_q = \frac{1}{\sigma^2}|V-S_q|^2,$$

where $S_q$ is the $q^{th}$ modulation constellation from a Q-ary modulations set $\{S_1, \ldots, S_Q\}$.

In some embodiments of the invention, the symbol log-likelihood calculation considers a constellation skew angle and a residual phase noise through the use of a linear transform approximation as follows $$D_q = \frac{1}{\sigma^2}|V-S_q|^2 - \frac{2\hat{\sigma}_p^2(\Im[V^*S_q^{\hat{\phi}}])^2}{\sigma^2(\sigma^2+2\hat{\sigma}_p^2|S_q^{\hat{\phi}}|^2)} + \frac{1}{2}\log(\sigma^2+2\hat{\sigma}_p^2|S_q^{\hat{\phi}}|^2), \quad (1)$$

where $\hat{\sigma}_p^2$ is an estimate of the residual phase noise variance, $\Im[.]$ is an imaginary part of a complex-valued argument, a superscript of $[.]^*$ denotes a complex conjugate, and $S_q^{\hat{\phi}}$ is an angular-skewed constellation of the $q^{th}$ modulation $S_q$. The angular-skewed constellation $S_q^{\hat{\phi}}$ is defined as $S_q^{\hat{\phi}} = \Re[S_q]+(\sin(\hat{\phi})+j\cos(\hat{\phi}))\Im[S_q]$, where $\hat{\phi}$ is an estimate of the skew angle and $\Re[.]$ is a real part of a complex-valued argument.

In one embodiment of the invention, the symbol log-likelihood calculation is based on a bilinear transform approximation $\exp(j\theta)\cong(1+j\theta/2)/(1-j\theta/2)$. For example, this embodiment of the invention modifies the symbol log-likelihood Equation (1) by substituting V and $S_q^{\hat{\phi}}$ with $(3V-S_q^{\hat{\phi}})/2$ and $(V+S_q^{\hat{\phi}})/2$, respectively.

The symbol likelihood calculator 131 uses the estimates of the skew angle $\hat{\phi}$ and the phase noise variance $\hat{\sigma}_p^2$, those of which are provided by the skew angle estimator 133 and the phase noise estimator 134, respectively. To estimate the skew angle and the phase noise variance, some embodiments of the invention use statistical learning techniques, such as a k-means method. For example, the skew angle and the phase noise variance are obtained by using an expectation-maximization (EM) algorithm based on a Gaussian mixture model (GMM). The number of mixtures in the GMM is at least a size of the modulation format.

Figure 3:
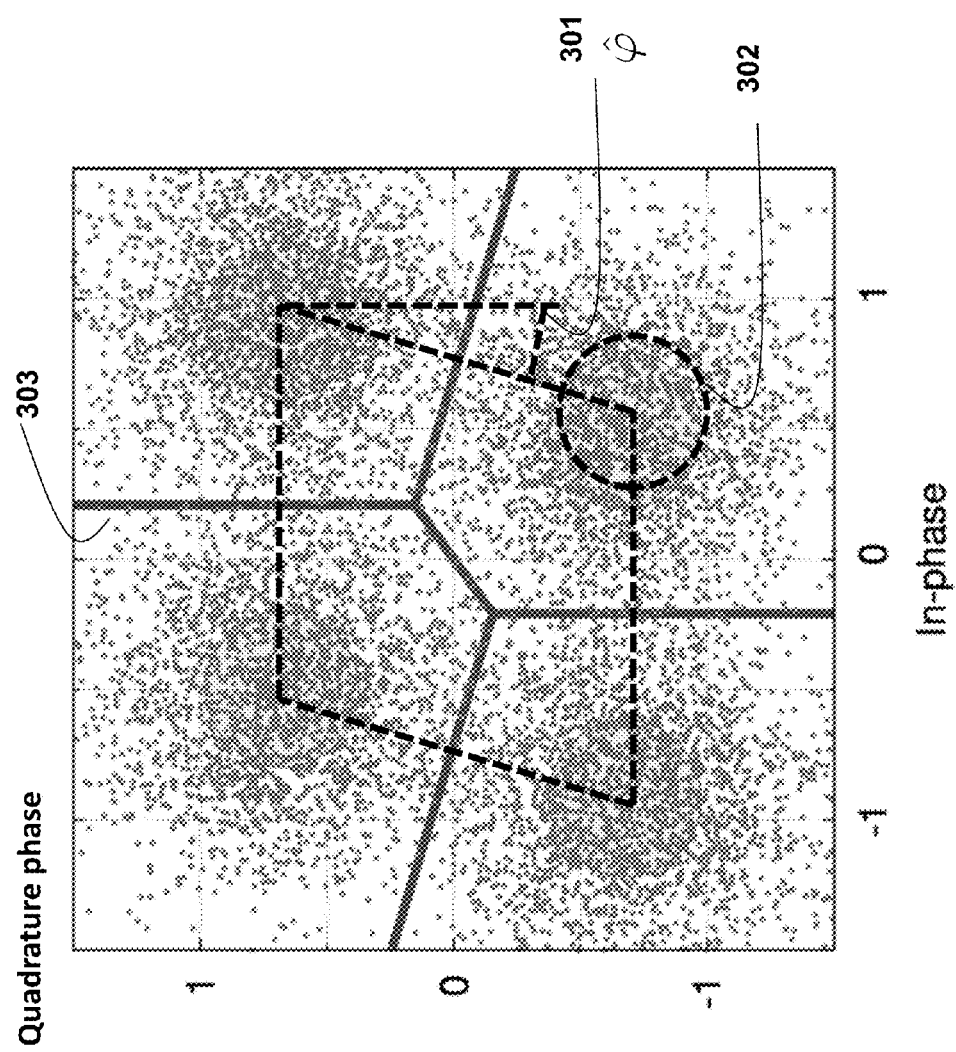
FIG. 3 is a plot of samples of skewed constellation estimation using a Gaussian mixture model according to embodiments of the invention.

FIG. 3 is a plot of some samples of the phase-recovered signals V(k) in the presence of a skew angle of φ=11.6 degrees for Q=4 QAM modulations. Using the EM algorithm for the GMM, the skew angle 301 and the cluster variance 302 are jointly estimated. Due to the angular skew, a cluster decision boundary 303 to separate the four different constellation points deviates from a regular square-grid.

The bit LLR calculator 132 generates the $b^{th}$ bit LLR data $L_b$ from the symbol log-likelihood $D_q$ as follows $$L_b = \log\frac{\sum_{[p]_b=0} \exp(-D_p)}{\sum_{[q]_b=1} \exp(-D_q)}$$

where the numerator is a sum over each constellation index p, whose $b^{th}$ bit is zero, and the denominator is a sum over each constellation index q, whose $b^{th}$ bit is one.

In some embodiments of the invention, the bit LLR calculator 132 uses the feedforward soft-decision information 122, i.e., the state-transition matrix of the HMM, to provide more reliable bit LLR data to the FEC decoder 140. For example, the bit LLR is calculated by using a Bahl-Cocke-Jelinek-Raviv (BCJR) algorithm for a maximum a posteriori probability (MAP) estimation along a trellis-state diagram defined by the state-transition matrix Π. A branch metric from $q^{th}$ state to $q'^{th}$ state in the BCJR algorithm is obtained as $$\xi_{q,q'}\exp(-D_{\tilde{q}})[\Pi]_{q,q'}, \quad (2)$$

where $\tilde{q}$ is a permuted constellation index according to the state slip from q to q'.

The BCJR algorithm calculates a forward path metric which accumulates the branch metric in a forward Viterbi procedure, a backward path metric which accumulates the branch metric in a time-reversed direction with a backward Viterbi procedure, and the bit LLR data $L_b$ which adds up the branch metric, the forward and backward path metrics.

In one embodiment of the invention, the bit LLR calculator 132 uses feedback soft-decision information 135 from the FEC decoder 140 in addition to the feedforward soft-decision information 122, as a turbo principle to improve performance by re-calculating the bit LLR data. For this embodiment, the bit LLR calculator 132 modifies the branch metric Equation (2) by including the feedback soft-decision information $\lambda_b$ as follows $$\xi_{q,q'}\exp(-D_{\bar{q}})[\Pi]_{q,q'}\exp(-\tfrac{1}{2}\Sigma_i\lambda_i(-1)^{[q'^i]}).$$

After the BCJR algorithm, the bit LLR data $L_b$ is subtracted 136 by the feedback soft-decision information $\lambda_b$ as $L_b-\lambda_b$, and sent to the FEC decoder 140. In one embodiment, the BCJR algorithm is simplified by a max-log-MAP algorithm, in which only the most dominant branch metric is considered at forward and backward Viterbi procedures. Alternatively, a soft-output Viterbi algorithm is used to generate an approximated bit LLR data to reduce complexity.

The FEC decoder 140 corrects potential errors of the LLR data from the demodulator 130. The FEC codes include a convolutional code, a turbo code, a repeat-accumulate code, a rate-less code, and a low-density parity-check (LDPC) code. For example, the FEC decoder 140 for the LDPC codes includes parallel variable-node decoders (VND) 141, parallel check-node decoders (CND) 142, a syndrome checker 144, and a hard decision module 146 to produce hard decisions for symbols 102 corresponding to the received data. The LDPC decoder exchanges soft-decision information between VND and CND in an inner loop 143 based on belief propagation (BP) until a termination condition meets.

The termination condition includes a maximum number of BP iterations or a success of the syndrome check. The BP algorithm may use a sum-product algorithm, a min-sum algorithm, or a delta-min algorithm. After the BP iterations, a hard decision 146 for the soft-decision information is taken place to recover the transmitted data.

In one embodiment of the invention, the soft-decision information $\lambda_b$ of the VND are subtracted 145 by the original LLR information $L_b$ from the demodulator as $\lambda_b-L_b$, and fed back to the demodulator 130 to receive more reliable LLR data in a turbo loop 135. In one embodiment of the invention, the FEC codes use non-binary codes such as non-binary LDPC convolutional codes to improve error correction capability. For this embodiment, the bit LLR calculator 132 and the BP algorithm are modified according to the size of the Galois field of the non-binary LDPC codes in a straightforward manner.

Joint-Polarization Carrier Phase Recovery

Figure 4:
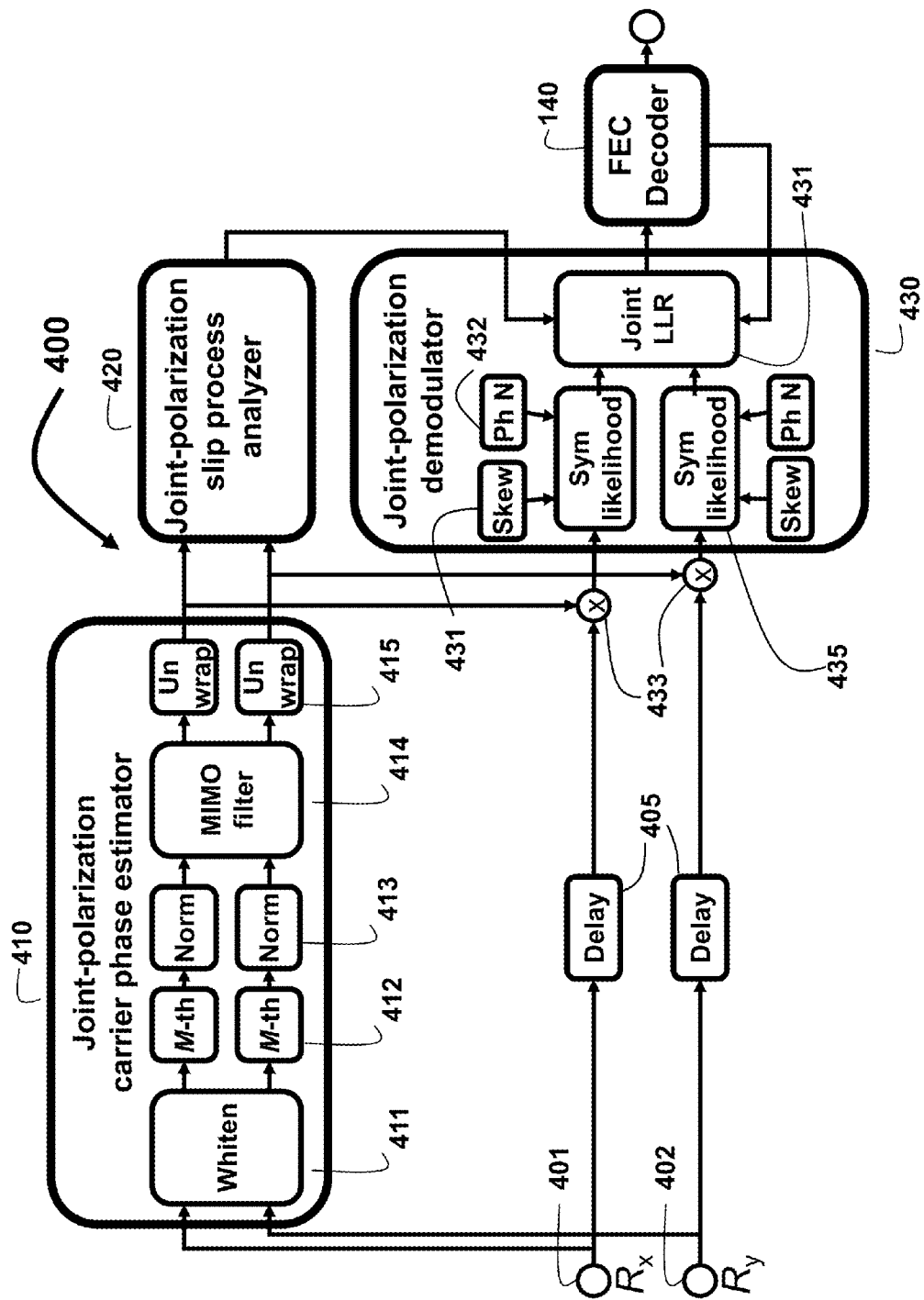
FIG. 4 is a block diagram of joint-polarization carrier phase recovery module according to embodiments of the invention.

As shown in FIG. 4, some embodiments of the invention recover the carrier phase of both x- and y-polarizations concurrently and jointly. The module 400 that implements the recovery method includes a joint-polarization CPE 410, a joint-polarization slip process analyzer 420, a joint-polarization demodulator 430, and the FEC decoder 140.

The joint-polarization CPE 410 includes a whitening filter 411, parallel $M^{th}$ power modules 412, parallel amplitude normalizers 413, a multi-input multi-output (MIMO) low-pass filter 414, and parallel phase unwrapping modules 415.

The whitening filter receives the x-polarization signal $R_x$ 401 and y-polarization signal $R_y$ 402 to coarsely cancel a cross-correlation between x- and y-polarization signals. The cross-correlation may be caused by an imperfect polarization recovery and/or by a correlated phase noise of optical laser linewidth.

Figure 5B:
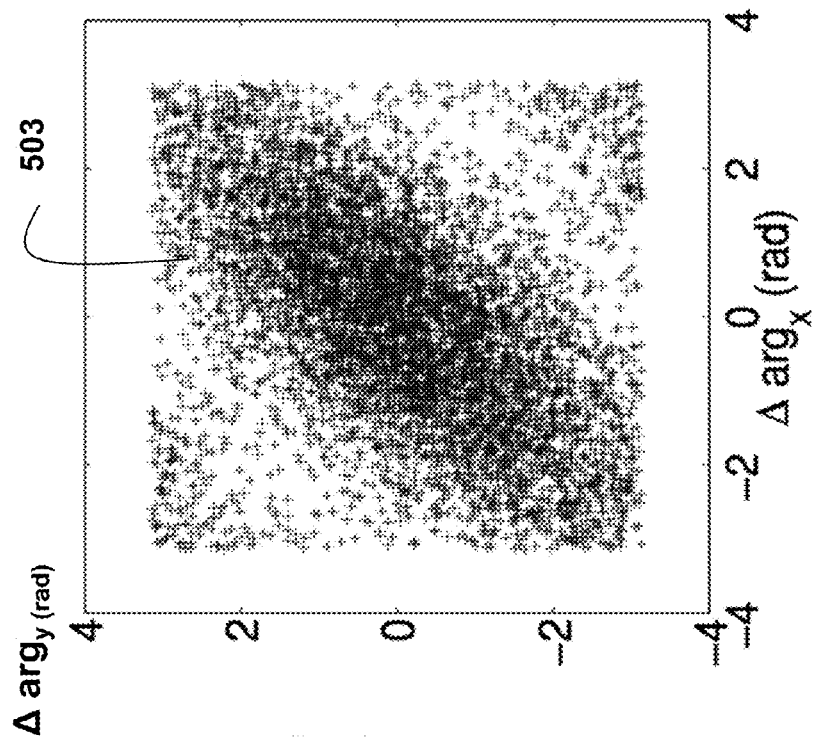
FIG. 5B is a plot of mutual correlated phase noise deviations of x- and y-polarizations.
Figure 5A:
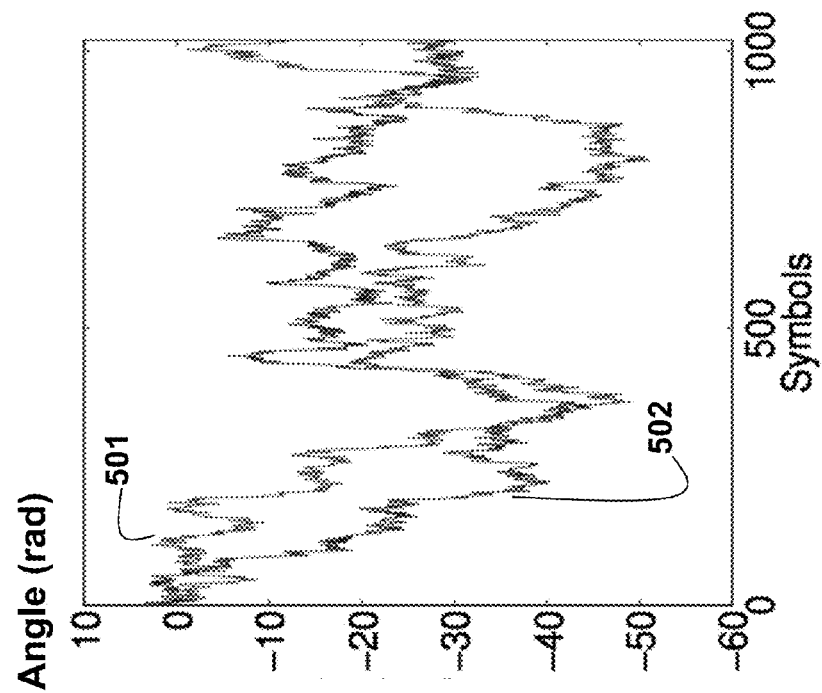
FIG. 5A is a plot of samples of phase trajectories of x-polarization and y-polarization as a function of angle and symbols received over time.

For example, FIG. 5A shows samples of the phase trajectories of x-polarization 501 and y-polarization 502 as a function of angel and symbols received over time.

FIG. 5B shows that the phase noise deviations of x- and y-polarizations are mutually correlated 503.

For the joint-polarization CPE 410, the auto-covariance matrix of the phase noise becomes a convolution of the temporal covariance $K_{time}$ and a polarization covariance $K_{pol}$ as $K_p=K_{time}\otimes K_{pol}$, where $\otimes$ denotes a Kronecker product. For example, the polarization covariance matrix is expressed as $$K_{pol}=\begin{pmatrix}1 & C_p\\ C_p & 1\end{pmatrix},$$

where $C_p$ is a cross-correlation between the x-polarization and y-polarization signals. The whitening filter 411 cancels the cross-correlation by multiplying an inverse square root of the covariance matrix, i.e., $K_{pol}^{-1/2}$, with the received dual-polarization signals vector of $[R_x, R_y]^T$.

The MIMO low-pass filter 414 suppresses additive noise by using the joint-polarization auto-covariance. For example, the MIMO low-pass filter uses a multivariate minimum mean-square error (MMSE) FIR filter. In one embodiment the invention, the MIMO low-pass filter is based on an MIMO least-mean square (LMS) adaptive filter, or an MIMO recursive least-squares (RLS) adaptive filter. In another embodiment, the MIMO low-pass filter is based on a kernel filter, including a kernel Kalman filter, a kernel support-vector machine, an artificial neural network, and a particle filter, to deal with nonlinear channel statistics.

After the phase unwrapping and decision modules 415, the dual-polarization phase estimates are used to recover 433 the carrier phases of the x-polarization signal $R_x$ 401 and y-polarization signal $R_y$ 402 via delays 405.

The joint-polarization slip process analyzer 420 feeds the dual-polarization phase estimates and estimates a dual-polarization state-transition matrix based on a multivariate HMM, in which two slip states are considered at once.

For example, the first-order HMM has a total number of states of at least $M^2$, which represent all combinations of the x-polarization state and the y-polarization state. The joint-polarization state-transition matrix is estimated by using a Kalman filter, and is sent to the joint-polarization demodulator 430 to compensate for potential cycle slips. One embodiment may use an extended Kalman smoother, in which the estimation is taken place with a certain lag.

The joint-polarization demodulator 430 receives phase-recovered x-polarization signals and y-polarization signals to calculate 435 the corresponding symbol likelihood data, using estimated skew angles 431 and phase noise variances 432 as in the case of a single polarization embodiment. A joint-polarization LLR calculator 431 then calculates bit LLR data for both polarizations at once, according to the feedforward soft-decision information, i.e. the joint-polarization state-transition matrix, from the slip process analyzer 420.

For example, the bit LLR data are obtained by using the BCJR algorithm along an extended trellis-state diagram based on the joint-polarization state-transition matrix. The bit LLR data are sent to the FEC decoder 140. In one embodiment, the joint-polarization demodulator 430 uses feedback soft-decision information from the FEC decoder 140 in a turbo principle to improve performance by re-calculating the bit LLR.

In some embodiments of the invention, the method to recover the joint polarization carrier phase is extended to a higher-dimensional signal space. For example, the number of signals increases to more than two when the optical communications system uses space-division multiplexing, mode-division multiplexing, wavelength-division multiplexing, or frequency-division multiplexing as well as polarization-division multiplexing. For those embodiments, the auto-covariance matrix is further extended by jointly considering the convolution of a spatial covariance matrix, a modal covariance matrix, and so on. The MIMO filter 414 can be extended to any multi-dimensional signal space in a straightforward manner, by the use of any MIMO adaptive filter such as the RLS algorithm and the Kalman filter.

Pilot-Aided Carrier Phase Recovery

In some embodiments of the invention, the transmitter for optical communications periodically inserts known pilot symbols into the transmitted sequence. For example, J-symbol pilots are inserted every N-symbol data, e.g., J=1 and N=99 for a pilot overhead of 1%. One embodiment of the invention uses the pilot symbols at the demodulator 130 or the joint-polarization demodulator 430 to provide more reliable LLR data to the FEC decoder 140. For example, the bit LLR calculator 132 or the joint LLR calculator 431 uses the BCJR algorithm in the trellis-state diagram, wherein the branch metric Equation (2) is restricted for the known pilot index q̃ at pilot symbols. By restricting the branch metric calculation in the pilot symbols, more reliable LLR data are achieved for the FEC decoder 140 to correct potential errors more efficiently.

Another embodiment of the invention uses the pilot symbols at the CPE 110 or 410, in addition to the demodulator, to estimate the carrier phase more accurately. For example, the CPE estimates the carrier phase by using a least-squares (LS) estimation as follows $$\hat{\theta}(k) = \angle \frac{R(k)}{S_{\tilde{q}}(k)}$$

where $S_{\tilde{q}}(k)$ is a pilot symbol with an index of q̃ at the $k^{th}$ symbol. In one embodiment of the invention, the accuracy of the phase estimation is improved by using multiple pilot symbols in a linear-transformed MAP estimation after the LS estimation.

For example, the pilot-aided CPE according to this embodiment re-estimates the carrier phase as follows $$\hat{\theta}' = \Re[(A^\dagger A + \kappa K_p^{-1})^{-1}(A^\dagger Y + \kappa K_p^{-1}\hat{\theta})]$$

where $\hat{\theta}'$ is an updated phase estimates vector, A is a diagonal matrix whose $k^{th}$ entry is given by pilot symbols as $jS_{\tilde{q}}(k)$, $\hat{\theta}$ is the initial phase estimates vector based on the LS solution, and Y is an error vector, whose $k^{th}$ entry is given as $V(k) - \exp(j\hat{\theta}(k)) S_{\tilde{q}}(k)$. The factor $\kappa$ is any positive real-valued number, e.g., $\kappa = K\sigma^{-2}$. The above phase re-estimation based on the linear-transformed MAP can be done until the convergence.

In some embodiments of the invention, the carrier phases during data symbols are interpolated by the phase estimates at pilot symbols. For example, an MMSE interpolation based on the phase noise auto-covariance matrix is used to estimate the carrier phases during data symbols. Alternatively, a Gaussian process interpolation is used to provide the carrier phase estimates as well as the certainty level of the estimations. For example, the Gaussian process interpolation is carried out by using a Kriging interpolation, in which the certainty level is derived from the phase noise auto-covariance matrix $K_p$. The certainty level information is used at the demodulator to calculate more accurate likelihood data. For example, the certainty level determines the effective phase noise variance in the symbol likelihood calculation of Equation (1).

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for decoding received data sent from a transmitter to a receiver over an optical communications channel, comprising:
    a carrier phase estimator (CPE) to estimate a carrier phase of received symbols;
    a slip process analyzer to provide feedforward decision soft-information in a form of a slip state-transition matrix using a hidden Markov model (HMM) based on the carrier phase;
    a demodulator to calculate log-likelihood ratios (LLR) according to the feedforward soft-decision information; and
    a forward-error-correction (FEC) decoder to produce hard decision on symbols corresponding to the data, and to correct errors.

2. The system of claim 1, wherein the CPE, further comprises:
    a power module to suppress modulation-dependent phase deviation;
    an amplitude normalizer to suppress modulation-dependent amplitude deviation;
    a low-pass filter to suppress additive noise;
    a phase unwrapping module to resolve phase ambiguities; and
    a phase decision module to recover the carrier phase of the received data.

3. The system of claim 2, wherein the amplitude normalizer is based on a conditional mean over all modulations to minimize phase estimation errors.

4. The system of claim 2, wherein the low-pass filter is based on a moment-matching system and a linear-transformed Wiener filter according to an auto-covariance of the phase noise.

5. The system of claim 2, wherein the phase unwrapping is based on at least two consecutive phase estimates to minimize a Mahalanobis norm.

6. The system of claim 1, wherein the slip process analyzer estimates the slip state-transition matrix in a time-inhomogeneous hidden Markov model (HMM) using an extended Kalman filter for at least two consecutive phase estimates.

7. The system of claim 1, wherein the demodulator, further comprising:
    a skew angle estimator to estimate a constellation skew angle;
    a phase noise estimator to estimate a residual phase noise variance;
    a symbol likelihood calculator to determine a symbol log-likelihood of the phase-recovered symbols according to the constellation skew angle and the residual phase noise variance; and
    a bit LLR calculator to calculate LLR data for the FEC decoder from the symbol log-likelihood data and the feedforward soft-decision information.

8. The system of claim 7, wherein the constellation skew angle and the residual phase noise variance are estimated using an expectation-maximization (EM) algorithm based on a Gaussian mixture model (GMM), wherein a number of mixtures in the GMM is at least a size of a modulation format.

9. The system of claim 7, wherein the symbol likelihood calculator uses a linear transform approximation or a bilinear transform approximation to account for the residual phase noise variance.

10. The system of claim 7, wherein the bit LLR calculator uses a Bahl-Cocke-Jelinek-Raviv (BCJR)-based maximum a posteriori probability (MAP) algorithm along a trellis diagram defined by the state-transition matrix of the slip process analyzer.

11. The system of claim 7, wherein the bit LLR calculator uses feedback soft-decision information from the FEC decoder in a turbo loop in addition to the feedforward soft-decision information from the slip process analyzer.

12. A system for decoding data sent from a transmitter to a receiver over an optical communications channel with multi-dimensional signals, comprising:
  a multi-input multi-output (MIMO) carrier phase estimator (CPE) to jointly estimate carrier phases of the multi-dimensional received signals;
  an MIMO slip process analyzer to provide a feedforward soft-decision information in a form of a slip state-transition matrix based on a hidden Markov model (HMM);
  an MIMO demodulator to calculate likelihoods for multi-dimensional signals according to the feedforward soft-decision information from the MIMO slip process analyzer; and
  a forward-error-correction (FEC) decoder to produce hard decision on symbols corresponding to the data, and to correct errors.

13. The system of claim 12, wherein the MIMO CPE, further comprises:
  a whitening filter to cancel cross-correlations of the multi-dimensional signals;
  parallel power modules to suppress modulation-dependent phase deviation;
  parallel amplitude normalizers to suppress modulation-dependent amplitude deviation;
  an MIMO low-pass filter to suppress additive noise;
  parallel phase unwrapping modules to resolve each phase ambiguity; and
  parallel phase decision modules to recover the carrier phase of each the multi-dimensional signal.

14. The system of claim 12, wherein the demodulator uses a pilot-aided LLR calculation based on a restricted trellis state transition at known pilot symbols.

15. The system of claim 12, wherein the MIMO CPE uses a pilot-aided phase estimation based on an iterative linear-transformed MAP estimation from a least-squares initial estimation.

16. The system of claim 12, wherein the MIMO CPE and the demodulation are based on nonlinear filters using a kernel filter, an extended Kalman filter, an artificial neural network, a particle filter, or a smoothing variants.

17. The system of claim 1 or claim 12, wherein the FEC decoder uses a belief propagation to decode a low-density parity-check (LDPC) code of any arbitrary Galois field size.

18. The system of claim 15, wherein the MIMO CPE uses a Kriging interpolation between pilot symbols to estimate the carrier phase of the multi-dimensional signals.

19. The system of claim 12, wherein the multi-dimensional signals are received in polarization-division multiplexing, mode-division multiplexing, wavelength-division multiplexing, and/or space-division multiplexing.

20. A method for decoding received data sent from a transmitter to a receiver over an optical communications channel, comprising steps:
  estimating a carrier phase of received symbols corresponding to the data;
  providing feedforward soft-decision information in a form of a slip state-transition matrix using a hidden Markov model (HMM) based on the carrier phase;
  calculating log-likelihood ratios (LLR) according to the feedforward soft-decision information; and
  producing hard decision on symbols corresponding to the data, and to correct errors, wherein the steps are performed in a decoder of the receiver.

* * * * *